(12) United States Patent
Song et al.

(10) Patent No.: US 8,473,499 B2
(45) Date of Patent: Jun. 25, 2013

(54) QUESTION AND ANSWER FORUM TECHNIQUES

(75) Inventors: Young-In Song, Beijing (CN); Liu Jing, Beijing (CN); Chin-Yew Lin, Beijing (CN); Tetsuya Sakai, Beijing (CN)

(73) Assignee: Microsoft Corporation, Redmond, WA (US)

( * ) Notice: Subject to any disclaimer, the term of this patent is extended or adjusted under 35 U.S.C. 154(b) by 69 days.

(21) Appl. No.: 13/274,796

(22) Filed: Oct. 17, 2011

(65) Prior Publication Data

US 2013/0097178 A1 Apr. 18, 2013

(51) Int. Cl.
| | | |
|---|---|---|
| G06F 15/18 | (2006.01) | |
| G06F 17/30 | (2006.01) | |
| G06E 1/00 | (2006.01) | |
| G06N 5/04 | (2006.01) | |

(52) U.S. Cl.
USPC .............................. 707/748; 706/20; 706/61

(58) Field of Classification Search
USPC .......................... 706/20, 25, 61; 707/736, 748
See application file for complete search history.

(56) References Cited

U.S. PATENT DOCUMENTS

| | | | | |
|---|---|---|---|---|
| 8,185,482 | B2* | 5/2012 | Yang et al. ....................... | 706/12 |
| 8,204,751 | B1* | 6/2012 | Di Fabbrizio et al. ........ | 704/275 |
| 8,275,803 | B2* | 9/2012 | Brown et al. ................. | 707/802 |
| 2002/0065845 | A1* | 5/2002 | Naito et al. ................ | 707/500.1 |
| 2006/0286530 | A1 | 12/2006 | Forrest et al. | |
| 2008/0215541 | A1* | 9/2008 | Li et al. .............................. | 707/3 |
| 2009/0012926 | A1* | 1/2009 | Ishikawa et al. ................ | 706/47 |
| 2009/0070311 | A1* | 3/2009 | Feng ................................. | 707/5 |
| 2009/0162824 | A1 | 6/2009 | Heck | |
| 2009/0254499 | A1* | 10/2009 | Deyo .............................. | 706/12 |
| 2009/0276381 | A1* | 11/2009 | Boies et al. ..................... | 706/12 |
| 2010/0063797 | A1* | 3/2010 | Cong et al. ........................ | 704/9 |
| 2010/0191686 | A1 | 7/2010 | Wang et al. | |
| 2010/0235343 | A1* | 9/2010 | Cao et al. ...................... | 707/710 |
| 2011/0119264 | A1 | 5/2011 | Hu et al. | |

OTHER PUBLICATIONS

Adamic et al., "Knowledge Sharing and Yahoo Answers: Everyone Knows Something," WWW 2008, Apr. 21-25, 2008, Beijing, China, retrieved at <<http://citeseerx.ist.psu.edu/viewdoc/download?doi=10.1.1.124.6014&rep=rep1&type=pdf>>, pp. 665-674.

Agichtein et al., "Finding High-Quality Content in Social Media," Proceedings of the International Conference on Web Search and Web Data Mining, pp. 183-194, Feb. 11-12, 2008, Palo Alto, California, retrieved at <<http://www.mathcs.emory.edu/~eugene/papers/wsdm2008quality.pdf>>, 11 pages.

(Continued)

*Primary Examiner* — Jorge A Casanova
(74) *Attorney, Agent, or Firm* — Lee & Hayes, PLLC

(57) ABSTRACT

Techniques for unsupervised management of a question and answer (QA) forum include labeling of answers for quality purposes, and identification of experts. In a QA thread, a ranking of answers may include an initial labeling of the longest answer in each thread as the best answer. Such a labeling provides an initial point of reference. Then, in an iterative manner answerers are ranked using the labeling. The ranking of answerers allows selection of experts and poor or inexpert answerers. A label update is performed using the experts (and perhaps inexpert answerers) as input. The label update may be used to train a model, which may describe quality of answers in one or more QA threads and an indication of expert and inexpert answerers. The iterative process may be ended upon convergence or upon a maximum number of iterations.

18 Claims, 5 Drawing Sheets

OTHER PUBLICATIONS

Balog et al., "Formal Models for Expert Finding in Enterprise Corpora," SIGIR'06, Aug. 6-11, 2006, Seattle, Washington, retrieved at <<http://krisztianbalog.com/files/sigir2006-expertsearch.pdf>>, 8 pages.

Bian et al., "Finding the Right Facts in the Crowd: Factoid Question Answering over Social Media," WWW 2008, Proceeding of the 17th International Conference on World Wide Web, Apr. 21-25, 2008, Beijing, China, retrieved at <<http://www.cc.gatech.edu/grads/j/jbian/paper/fp803-bian.pdf>>, 10 pages.

Bian et al., "Learning to Recognize Reliable Users and Content in Social Media with Coupled Mutual Reinforcement," WWW 2009, Apr. 20-24, 2009, Madrid, Spain, retrieved at <<http://www.mathcs.emory.edu/~eugene/papers/www2009-bian-cmr.pdf>>, 10 pages.

Blooma et al. "A predictive framework for retrieving the best answer" In Proc. of SAC, 2008, 5 pages.

Bouguessa, et al., Identifying authoritative actors in question-answering forum: the case of Yahoo! answers, Proceedings of SIGKDD, pp. 866-874, 2008.

Brin et al., "The Anatomy of a Large-scale Hypertextual Web Search Engine," 1998. In Proc. WWW, retrieved at <<http://citeseer.ist.psu.edu/viewdoc/download;jsessionid=7125CF8F087D4844704340541771DE4D?doi=10.1.1.109.4049&rep=rep1&type=pdf>>, 25 pages.

Cong et al., "Finding Question-Answer Pairs from Online Forums," SIGIR 2008, Jul. 20-24, 2008, Singapore, retrieved at <<http://research.microsoft.com/en-us/people/cyl/sigir2008-gao-msra.pdf>>, 8 pages.

Hoang et al., "A Model for Evaluating the Quality of User-Created Documents," Proceedings of AIRS, 2008, retrieved at <<http://citeseerx.ist.psu.edu/viewdoc/download;jsessionid=9893CD7FAE08B3A7BE9FFDDDD1811885?doi=10.1.1.137.7772&rep=rep1&type=pdf>>, 6 pages.

Ishikawa et al., "Overview of the NTCIR8 Community QA Pilot Task (Part I): The Test Collection and the Task," Proceedings of NTCIR-8 Workshop Meeting, Jun. 15-18, 2010, Tokyo, Japan, retrieved at <<http://research.nii.ac.jp/ntcir/workshop/OnlineProceedings8/NTCIR/01-NTCIR8-OV-CQA-IshikawaD.pdf>>, 12 pages.

Jeon, et al., "A Framework to Predict the Quality of Answers with Non-Textual Features," Proceedings of the 29th Annual International ACM SIGIR Conference on Research and Development in Information Retrieval, pp. 227-235, Aug. 6-10, 2006, Seattle, Washington, retrieved at <<http://citeseerx.ist.psu.edu/viewdoc/download?doi=10.1.1.89.6530&rep=rep1&type=pdf>>, 8 pages.

Jurczyk et al., "Discovering Authorities in Question Answer Communities by Using Link Analysis," CIKM'07, Nov. 6-8, 2007, Lisboa, Portugal, retrieved at <<http://citeseer.ist.psu.edu/viewdoc/download;jsessionid=4F56766463AD5AD3B627A6C7793CDA59?doi=10.1.1.93.6544&rep=rep1&type=pdf>>, 4 pages.

Kleinberg, "Authoritative Sources in a Hyperlinked Environment," Proceedings of the Annual ACM-SIAM Symposium on Discrete Algorithms, ACM, New York, 1998, retrieved at <<http://www-cgi.cs.cmu.edu/afs/cs/project/pscico-guyb/realworld/www/papers/kleinberg.pdf>>, pp. 668-677.

Li et al., "Routing Questions to Appropriate Answerers in Community Question Answering Services," CIKM'10, Oct. 26-30, 2010, Toronto, Ontario, Canada, retrieved at <<http://www.cse.cuhk.edu.hk/~king/PUB/CIKM2010-Li-p1585.pdf>>, 4 pages.

Liu et al., Predicting Information Seeker Satisfaction in Community Question Answering, SIGIR'08, Jul. 20-24, 2008, Singapore, retrieved at <<http://www.mathcs.emory.edu/~eugene/papers/sigr2008-cqa-satisfaction.pdf>>, 8 pages.

Liu et al., "Understanding and Summarizing Answers in Community-Based Question Answering Services," Proceeding of the 22nd International Conference on Computational Linguistics (Coling 2008), pp. 497-504, Manchester, Aug. 2008, retrieved at <<http://www.aclweb.org/anthology/C/C08/C08-1063.pdf>>, 8 pages.

Lu et al., "Latent Link Analysis for Expert Finding in User-Interactive Question Answering Services," SKG 2009, Fifth International Conference on Semantics, Knowledge and Grid, (c) 2009, retrieved at <<http://ieeexplore.ieee.org/stamp/stamp.jsp?arnumber=05368041>>, 6 pages.

Pal et al., "Expert Identification in Community Question Answering: Exploring Question Selection Bias," CIKM'10, Oct. 26-30, 2010, Toronto, Ontario, Canada, retrieved at <<http://www-users.cs.umn.edu/~apal/res/CQASelectionBias_CIKM10.pdf>>, 4 pages.

Sakai et al., "Overview of the NTCIR-8 Community QA Pilot Task (Part II): System Evaluation," Proceedings of NTCIR-8 Workshop Meeting, Jun. 15-18, 2010, Tokyo, Japan, retrieved at <<http://research.nii.ac.jp/ntcir/workshop/OnlineProceedings8/NTCIR/02-NTCIR8-OV-CQA-SakaiT.pdf>>, 25 pages.

Sakai et al., "Using Graded-Relevance Metrics for Evaluating Community QA Answer Selection," WSDM'11, Feb. 9-12, 2011, Hong Kong, China, retrieved at <<http://research.microsoft.com/en-us/people/tesakai/wsdm99-sakai.pdf>>, 10 pages.

Shah et al., "Evaluating and Predicting Answer Quality in Community QA," Proceeding of the 33rd International ACM SIGIR Conference on Research and Development in Information Retrieval (SIGIR '10). ACM, New York, NY, USA retrieved at <<http://www.unc.edu/~ chirags/papers/Shah_SIGIR2010.pdf>>, pp. 411-418, Date: 2010.

Song et al., "Microsoft Research Asia with Redmond at the NTCIR-8 Community QA Pilot Task," Proceedings of NTCIR-8 Workshop Meeting, Jun. 15-18, 2010, Tokyo, Japan, retrieved at <<http://research.nii.ac.jp/ntcir/workshop/OnlineProceedings8/NTCIR/03-NTCIR8-CQA-SongY.pdf>>, 8 pages.

Suryanto et al., "Quality-Aware Collaborative Question Answering: Methods and Evaluation," WSDM '09 Proceedings of the Second ACM International Conference on Web Search and Data Mining, Barcelona, Spain, retrieved at <<http://www.wsdm2009.org/papers/p142-suryanto.pdf>>, 10 pages, Date: 2009.

Wang et al., "Ranking Community Answers by Modeling Question-Answer Relationships via Analogical Reasoning," Proceedings of the 32nd International ACM SIGIR conference on Research and Development in Information Retrieval, pp. 179-186, Jul. 19-23, 2009, Boston, Massachusetts, retrieved at <<http://citeseerx.ist.psu.edu/viewdoc/download?doi=10.1.1.159.4194&rep=rep1&type=pdf>>, 8 pages.

White et al., "Effects of Community Size and Contact Rate in Synchronous Social Q&A," CHI '11 Proceedings of the 2011 annual conference on Human Factors in Computing Systems, May 7-12, 2011, Vancouver, BC, Canada, retrieved at <<http://research.microsoft.com/en-us/um/people/ryenw/papers/whitechi2011.pdf>>, 10 pages.

Yang et al., "Activity Lifespan: An Analysis of User Survival Patterns in Online Knowledge Sharing Communities," (c) 2010, Association for the Advancement of Artificial Intelligence (www.aaai.org), retrieved at <<http://misc.si.umich.edu/media/papers/ICWSM10_YangJ_10.pdf>>, 8 pages.

Zhang et al., "Expertise Networks in Online Communities: Structure and Algorithms," WWW 2007, May 8-12, 2007, Banff, Alberta, Canada, retrieved at <<http://citeseerx.ist.psu.edu/viewdoc/download?doi=10.1.1.75.3108&rep=rep1&type=pdf>>, pp. 221-230.

* cited by examiner

QUESTION AND ANSWER FORUM TECHNIQUES

BACKGROUND

Question and answer (QA) forums are common on the Internet. Such forums allow a question asker to post a question and one or more question answerers to respond to the question. Because the QA forum is on the Internet, it may provide information not only to the question asker, but also to many others having the same question.

Unfortunately, some question answerers offer poor advice. Others offer advertisements masquerading as advice in an effort to promote their own business interests. Occasionally, some question answerers offer malicious advice. Accordingly, while forums may include a wealth of knowledge, they may also offer worthless, self-serving or malicious answers.

Some forums are moderated by an individual, organization or corporation, and may help visitors to the forum by ranking answers or indicating best answers. In one example, the moderator provides means for a question asker to select a best answer. This may be helpful if the asker has tried the answer and found it to be useful. In another example, the moderator may track question answerers and accord some with expert status. In any case, moderated forums tend to perform many functions manually and are much more expensive than un-moderated forums.

Primarily for cost-related reasons, many QA forums are un-moderated. With no moderator, the value of many answers and answerers is uncertain, and commercial interests and unknowledgeable answerers are free to make contributions. Without initial labeling information, such as metadata labeling answers or answerers, known automated models are unable to correctly rank and manage answers. Accordingly, information of value may be lost among useless or malicious answers.

SUMMARY

Techniques for operating a question and answer (QA) forum are described herein. A QA forum allows users to present questions, which may be answered by other users of the forum. The techniques describe an initial labeling of answers of a QA thread based on answer length. Additional techniques describe aspects of an iterative mechanism wherein a ranking of answerers is created, and experts are selected based on the ranking. Updated labels are created based in part on the selected experts. The updated labels may be used to train a model. The model may then be applied to unlabeled QA threads to obtain new labels. The iterative process may end when successive labelings of answers indicate convergence, or after a set number of iterations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
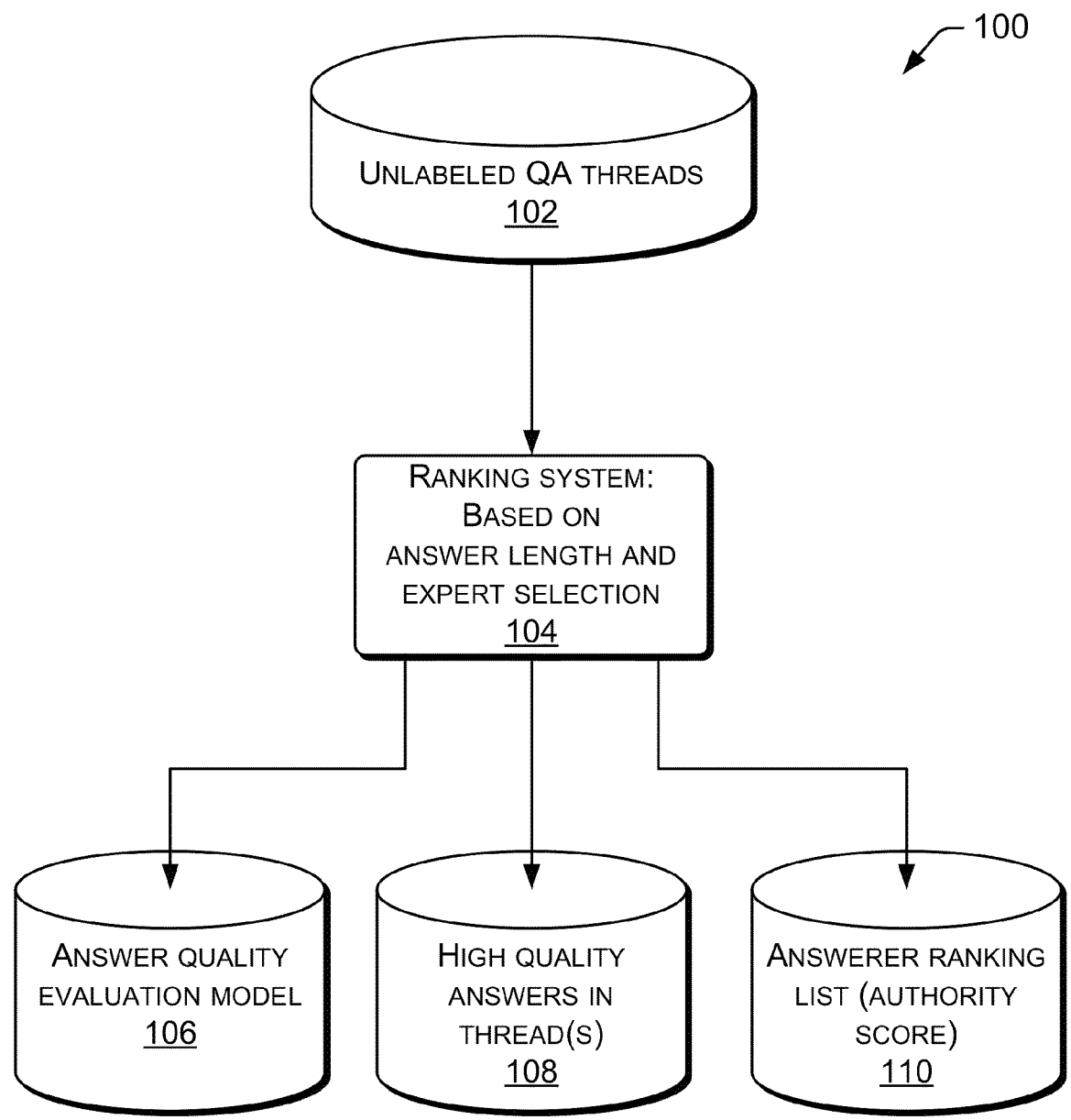
FIG. 1 is a diagram illustrating an example system configured for automated operation within a question and answer (QA) forum.

This disclosure describes techniques for use with question and answer (QA) threads, such as found in QA forums. Such a forum may include facilities for a user to ask a question. Question topics can include almost anything, such as computers, sports, entertainment, health or other topics. The forum also allows one or more answerers to post answers to the question. The techniques described herein relate to labeling answers to questions to indicate quality, ranking answerers, selecting experts, and training models for use in labeling.

An example illustrating some of the techniques discussed herein—not to be considered a full or comprehensive discussion—may assist the reader. In one example, techniques for QA forum management operate with little or no supervision, and may produce an answer quality evaluation model, an indication of high quality answers in thread(s), and/or an answerer ranking list. The techniques may begin by initially labeling QA threads based on answer length; e.g., labeling the longest answer in each thread as the best answer. Such labeling provides an initial point of reference, such as for operation of a model. An iterative process may be initiated. Answerers may be ranked using the labeling. Experts may be selected based on the ranked answerers. In some cases, poor or inexpert answerers may also be selected. A label update may be based on input including previous labels, experts, and in some cases, inexpert answerers. A model may be trained using the updated labels. A new iteration of labels may be derived by application of the model to unlabeled QA threads. The iterative process may be ended upon convergence of labels associated with successive iterations or upon a maximum number of iterations.

Note that the term "best answer" may indicate an answer that is tentatively and/or temporarily identified or labeled as a best answer. As such, the best answer may be an answer preferred by some users, but which may be replaced by a subsequently assigned best answer as more information is known. During an iterative process, a best answer within a thread may be redefined by each iteration, as the process progresses. Thus, the "best answer" may be a label assigned to an answer. As such, the label does not necessarily indicate that the answer is, in fact, the best answer. Instead, the label may indicate that the answer is indicated or selected within a progression that searches for a best answer. Such a search may end with an answer that is either a best answer or a reasonable approximation of a best answer. The latter is particularly true where the selection of a best answer is subjective, rather than objective.

The discussion herein includes several sections. Each section is intended to be non-limiting. More particularly, this entire description is intended to illustrate components and/or techniques that may be utilized in QA forum operation, but not components or techniques that are required. The discussion begins with a section entitled "Example Input and Output." This section describes a relationship between input, including unlabeled QA threads, and output. The output may include a trained answer quality evaluation model (e.g., a model trained for application to unlabeled threads to create labels), an indication (e.g., labeling) of high quality answers in a thread, and an answerer ranking list (e.g., answerers ranked by authority score). A second section, entitled "Example System for QA Forum and Thread Management" illustrates and describes elements in an unsupervised system that can be used to provide value to a QA thread. Example elements include an initial labeling function, a ranking function to rank answerers, an answerer identification function, a label update function, a labeling model and a label generator. A third section, entitled "Example Expert Identification Techniques" illustrates and describes techniques that may be used to identify experts (and also non-expert answerers) within a QA thread. A fourth section, entitled "Example Flow Diagrams for QA Thread and Forum Management" illustrates and describes techniques that may be used to enable unsupervised or un-moderated operation of a QA forum. Finally, the discussion ends with a brief conclusion.

This brief introduction, including section titles and corresponding summaries, is provided for the reader's convenience and is not intended to limit the scope of the claims or any section of this disclosure.

Example Input and Output

FIG. 1 shows a first example system 100 configured for automated operation in a question and answer (QA) forum, particularly showing input to, and output from, the example system. The example system 100 of FIG. 1 is provided as a specific instance to illustrate more general concepts, and not to indicate required and/or necessary elements.

Each thread contained in the unlabeled QA threads 102 may include a question and one or more answers. A QA "thread" may be a linear or "thread-like" sequence of a question followed by one or more answers, possibly organized according to time of receipt. The QA threads 102 may be located and/or displayed on a QA forum, which may be a webpage, website, document, data structure, database and/or "bulletin board" accessible over the Internet or other network. The question may be posed by a user, visitor and/or member to the QA forum, and the answers may be provided by users, visitors and/or members of the forum. While formats may vary, the QA thread may include a single question and one or more answers, each answer provided by an answerer.

The unlabeled QA threads 102 are considered to be "unlabeled" in that no "labels" and/or metadata is attached to, or associated with, threads within the unlabeled QA threads. Such labeling of answers within QA threads—not included in unlabeled QA threads 102—may include, for example, a value or ranking of one or more answers indicating a quality or helpfulness of those answers. For example, labeling may indicate a "best" answer in a QA thread. Additionally, good answers, bad answers, experts and inexpert or poor answerers may also be indicated by labeling of a QA thread. Such labeling may be independent between different QA threads, or the labeling of different threads may be related. For example, experts may be determined by examination of a single thread or a plurality of threads.

A ranking system 104 may be applied to the unlabeled QA threads 102. The ranking system 104 may operate based in part on answer length and in part on expert answerer selection. Answer length may be used as a tool to initially apply labels to the unlabeled QA threads 102, i.e., for an initial selection of a best answer for each thread within the unlabeled QA threads. The best answers may be used to create a hierarchy of answerers, i.e., an authority score for each answerer. Expert and non-expert answerers may be obtained from the list or hierarchy of answerers. The expert (and possibly non-expert) answerers may be used to provide an update or refinement to the labels. The updated labels may be used to train a model. The trained model may be applied to the unlabeled QA threads 102, to obtain labels indicating quality of answers within the threads. Such labels may indicate high quality answers within the QA threads, which may assist and provide value to users.

The output of the system 100 may include one or more of an answer quality evaluation model 106, high quality answers in threads 108 and an answerer ranking list 110. In one example of a model output by the system, the answer quality evaluation model 106 may be output after it is trained and/or constructed by operation of an iterative process. In one example of such a process, a current labeling of QA threads is used to rank answerers providing answers within the thread(s). From such a ranking, experts and poor answerers are identified. This identification may be used to update labels, which in turn are used to train the model. The iterative process may converge if a difference between successive iterations of labels is below a threshold value or a threshold amount of change. After convergence, the answer quality evaluation model 106 may be used to produce labels that identify the high quality answers in thread(s) 108.

The high quality answers in thread(s) 108 may be displayed for users to review and consider. The high quality answers in thread(s) 108 may be provided in a manner that excludes other answers, if desired, to reduce the "noise" in the QA forum. For example, by using only the high quality answers, commercial messages and poor quality answers are effectively eliminated.

The answerer ranking list 110 may include an authority score for one or more answerers in a particular thread or within the unlabeled QA threads 102. In one example, a single answerer may be indicated as an "expert" within a particular thread. In a further example, a number of experts and/or poor answerers may be identified in one or more threads. In a still further example, all answerers in one or more threads (e.g., the unlabeled threads 102) may be ranked in a hierarchy, such as according to an authority score applied to each answerer. The answer ranking list 110 and associated authority score(s) may be used in operation of a QA forum. For example, users may be directed to answers based on the authority of the answerer associated with the answer, as indicated by the answerer ranking list 110.

Example System for QA Forum and Thread Management

Figure 2:
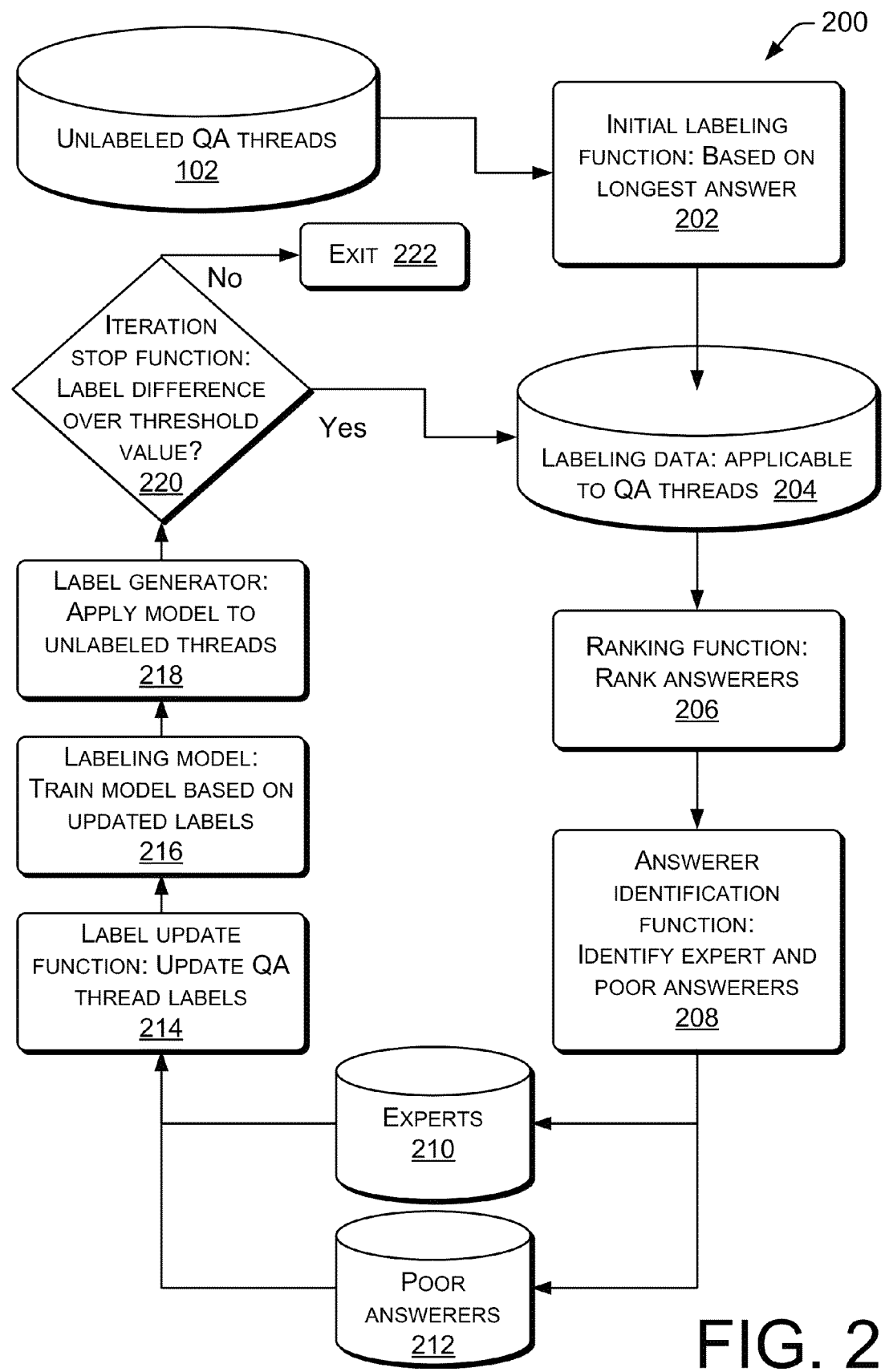
FIG. 2 is a diagram illustrating an example system configured to label answers in QA threads, to identify experts based on the labeling, to train a model and to re-label QA threads in an iterative manner that evaluates answer quality.

FIG. 2 shows a second example system 200 configured for automated operation in a question and answer (QA) forum, particularly showing iterative techniques by which QA threads may be labeled. The example system 200 of FIG. 2 is provided as a specific instance to illustrate more general concepts, and not to indicate required and/or necessary elements.

The unlabeled QA threads 102 may be obtained from a QA forum, website or other location. While a single QA thread may be obtained, in many instances a QA forum will provide a plurality of QA threads. Because they are "unlabeled," the unlabeled QA threads 102 do not have metadata indicating best answer(s), good answers, or any type of answerer hierarchy or ranking of authority. As a first operation in a labeling process, the unlabeled QA threads 102 may be provided to an initial labeling function 202.

The initial labeling function 202 may be configured to label a "best answer" in one or more QA threads. In one example, the longest answer in each QA thread may be initially set as the best answer. The longest answer may be the answer having the most text, data or overall content. Obtaining a best answer for at least one thread results in a first iteration of labeling data 204. In the example of FIG. 2, the labeling data 204 may be used to label the unlabeled QA threads 102. Subsequent iterations of blocks 206-220 in the system 200 may result in refinement of the labeling data 204. Convergence, and therefore an end to iteration, may be indicated when sequential iterations of the labeling data 204 differ by less than a threshold value.

A ranking function 206 may be used to rank answerers, and to thereby establish an authority score for at least some of the answerers associated with answers in the QA threads. In one example, the ranking function 206 may rank answerers based on the length of their longest answer, average answer length, number of best answers, speed to provide an answer after a question is posted, and/or other factors. The result of the ranking function 206 may be a hierarchical ranking of the answerers associated with answers in the unlabeled QA threads 102.

An answerer identification function 208 may be configured to identify expert and poor answerers. In one example, the answerer identification function 208 utilizes the ranking of answerers produced by the ranking function 206. The expert and poor answerers may be identified in any desired manner, such as by examination of a gradient of authority scores in a neighborhood about each answerer. Accordingly, the answerer identification function 208 may produce a listing of experts 210 and/or a listing of poor answerers 212 associated with one or more QA threads. Alternatively or additionally, the answerer identification function 208 may produce the answerer ranking list (authority score) 110 of FIG. 1.

A label update function 214 is configured to update labeling data 204. The label update function 214 may use labeling data 204, the identified experts 210 and/or poor answerers 212 as input. In many applications, the updated labels obtained from the label update function 214 are an improvement over the labeling data 204, in part because they reflect updated experts 210 and poor answerers 212.

A labeling model 216 may be trained using input based at least in part on the updated labels obtained from the label update function 214. The labeling model 216 may be based on any desired technology. As examples, the model may consider one or more of the following: a language model based relevance score, including a real-valued feature indicating a relevance score of an answer for a question in a QA thread; a square of normalized answer length feature, using the square of the answer length where the length is normalized by a maximum answer length in a same QA thread; existence of a URL (uniform resource locator) in an answer in the QA thread; authority of the answerer; and answerer position in a thread. When trained, the labeling model 216 is adapted for labeling unlabeled QA threads 102.

A label generator 218 may be used to obtain labels associated with a current iteration of the system 200. In one example, the label generator 218 applies the model 216 to the unlabeled QA threads 102. The output of application of the model 216 to the unlabeled QA threads 102 may include labels for some or all of the answers in one or more QA threads. Such labels may be used advantageously in the QA forum to promote or recommend better answer(s) in threads to users of the QA forum. For example, the labels may indicate a value of each answer, such as "best answer," "average answer" or "poor answer," which may influence users/readers of the QA thread to pay more or less attention to particular answers within the QA thread. The labels may be explicitly provided to the user, and/or the answers may be displayed to the user in a manner that reflects each answer's value. In an example of the former, a label may indicate a "best" answer. In an example of the latter, the labels may be used to rank the answers from best to worst when displaying the answers to the user.

An iteration stop function 220 may be configured to stop the iterative process of refining labels and picking expert and inexpert answerers. In one example, the iteration stop function 220 may indicate an end to iteration based on convergence of sequential label sets, and exit at 222. In this example, the labels created by the label generator 218 may be compared to a previous labeling data 204 created by the label generator (or the initial labeling function 202) at a previous iteration. If the comparison indicates change between successive labelings of the threads that is below a threshold value, then the labels and the process are considered to have converged. Upon convergence, the labels of the final iteration are saved, and the process exits at 222. In another example, if the iterative process has been executed a threshold number of times, the process ends at exit 222. In a further example, some combination of convergence and a maximum iteration value is utilized, such as exiting upon convergence or a maximum iteration number, whichever comes first. If an exit condition is not indicated, then the labels derived by the label generator 218 become the labeling data 204 applied to the labeled QA threads in the next iteration.

Example Expert Identification Techniques

Figure 3:
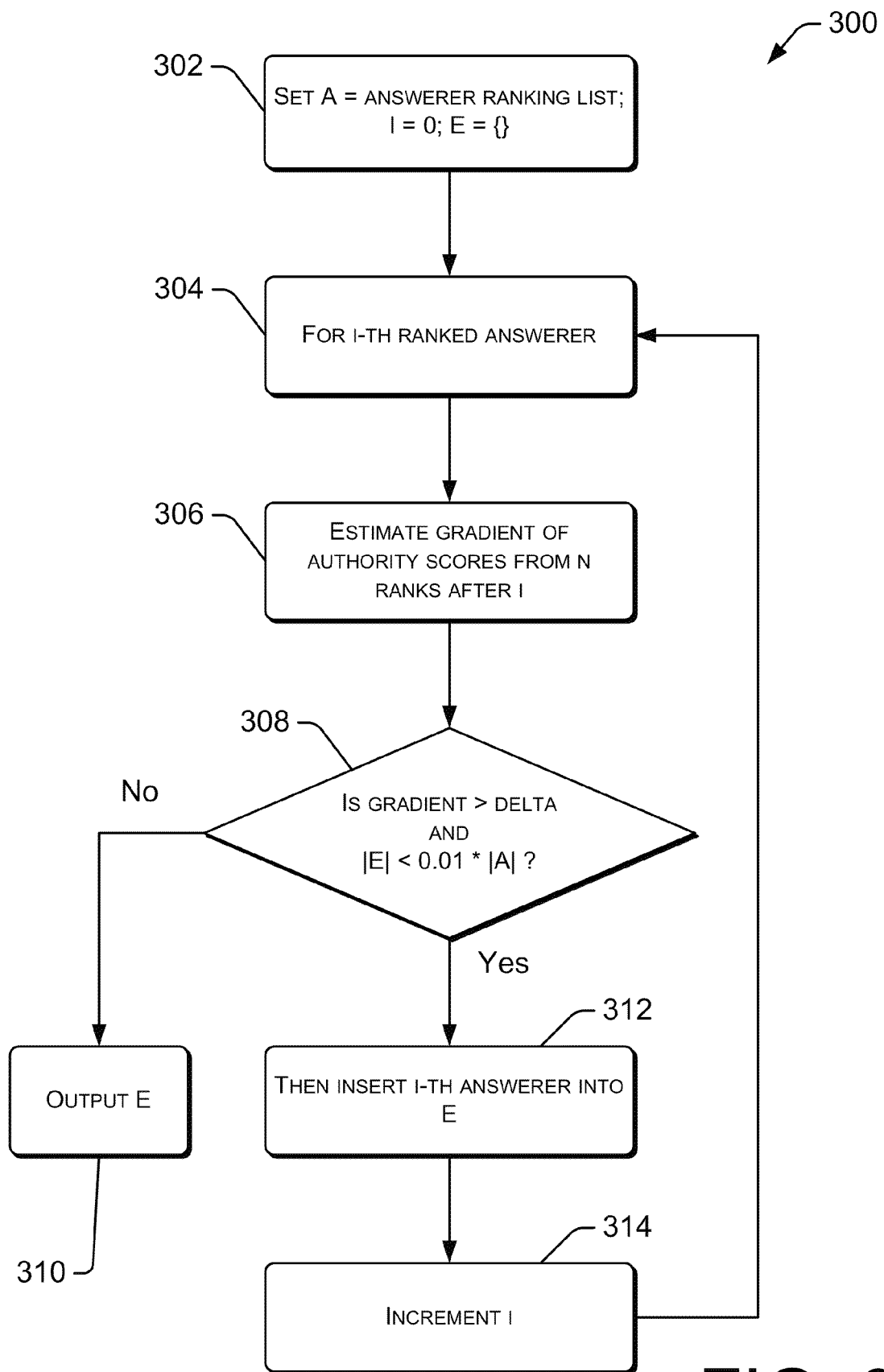
FIG. 3 is a flow diagram illustrating an example process configured to identify expert answerers in a QA thread.

FIG. 3 is a flow diagram illustrating an example process 300 configured to identify experts, i.e., expert answerers in a QA thread. Such an example process 300 may be utilized by the answerer identification function 208 to identify expert answerers. At block 302, an answerer ranking list is described by the value "A." The answerer ranking list "A" may include a hierarchy of answerers based on authority score. In one example, the answerer ranking list "A" may have been generated by the ranking function 206 of FIG. 2. An iteration variable "i" is set to 0, and a set of experts, "E," is set to an empty set ff.

At block 304, an iterative loop is entered for a new value of the iterative variable "i." At block 306, an estimate is made of a gradient of authority scores in a region "n" ranks after the i-th ranked answerer, or in a region about the i-th ranked answerer. In one example, if "n" is set to the value 5, then a gradient is derived from the authority scores of the 5 answerers after a current i-th answerer. In particular, the gradient is obtained from the answerer ranking list "A." This gradient is then considered.

At block 308, the gradient is compared to a value "delta." The value delta may be selected and/or adjusted experimentally. Adjustment of delta controls a number of experts within a population of answerers. When the gradient exceeds the value delta, the n answerers after the i-th answerer are of have considerable authority. Additionally, if the number of elements in the set of experts "E" is less than 1% of the size or number of answerers in "A," then the i-th answerer is in an elite grouping. When these two conditions are true, the i-th answerer is inserted into the set of experts E at block 312. If one or both of the conditions is not true, the set of experts is considered complete, and is output at 310. Regarding the decision at block 308, if the gradient is less than or equal to delta, then it may be the case that the i-th answerer is too average to be considered an expert. Similarly, if the set of experts has grown to 1% of the number of answerers in A, then the i-th answerer may be too average to be considered an expert. Either of these conditions indicate that the set of experts, E, is complete. At block 314, the iteration counter "i" is incremented, and the loop 304-312 may be repeated.

Figure 4:
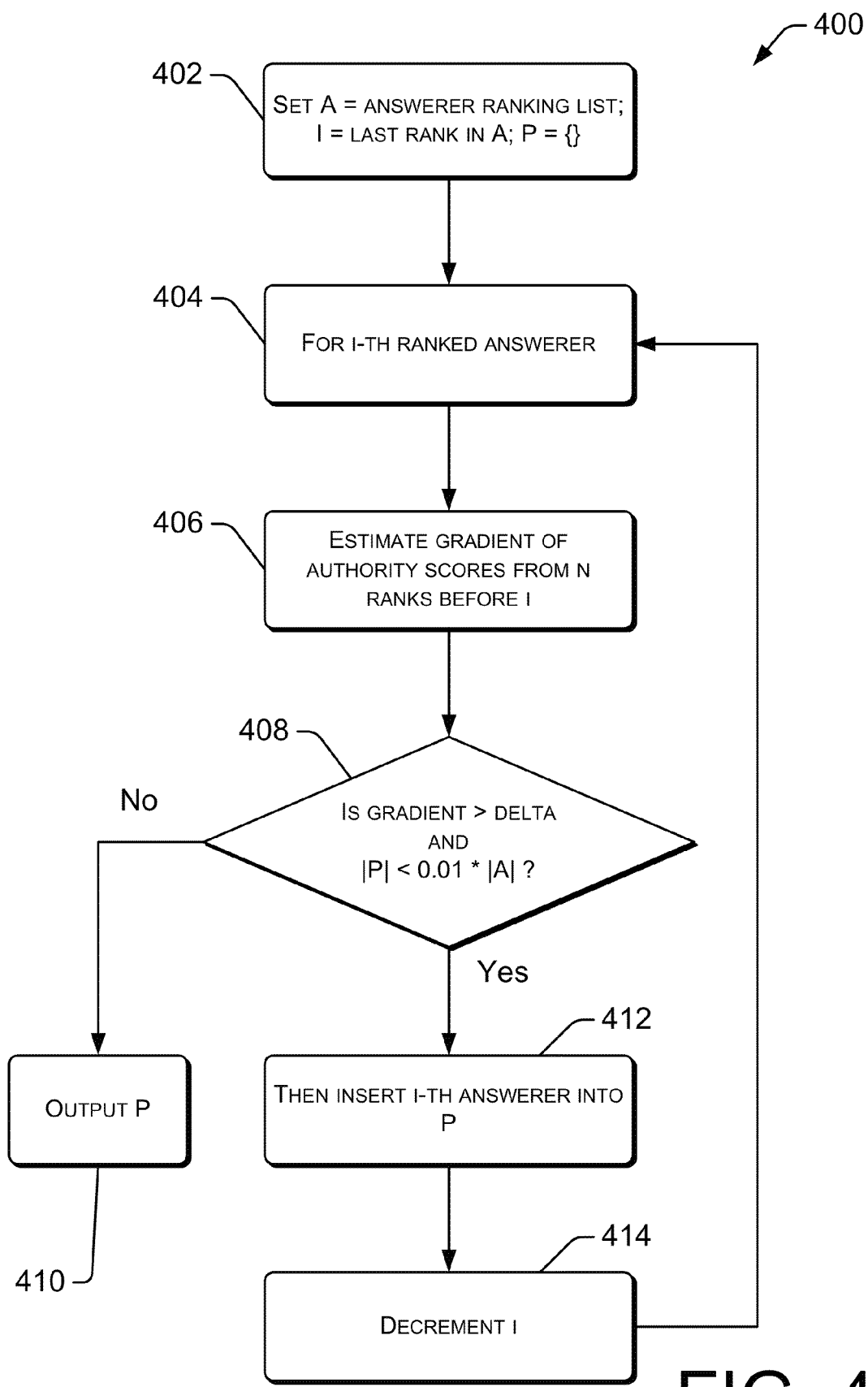
FIG. 4 is a flow diagram illustrating an example process configured to identify poor answerers in a QA thread.

FIG. 4 is a flow diagram illustrating an example process 400 configured to identify poor answerers, i.e., poor answerers in a QA thread. Such an example process 400 may be utilized by the answerer identification function 208 to identify poor answerers. In contrast with the expert answer process 300, which began from the best-ranked answer and moved toward the worst-ranked answer, and which considered the gradient of the n answerers after the i-th answerer, the poor answerer process 400 begins at the worst-ranked answerer and moves toward the best-ranked answerer, and considers the gradient of the n answerers before the i-th ranked answerer.

At block 402, an answerer ranking list is described by the value "A." The answerer ranking list A may include a hierarchy of answerers based on authority score. In one example, the answerer ranking list "A" may have been generated by the ranking function 206 of FIG. 2. An iteration variable "i" is set to the last rank in A (i.e., set to the worst answerer in A) and a set of poor answerers, "P," is set to an empty set ff.

At block 404, an iterative loop is entered for a new value of the iterative variable "i." At block 406, an estimate is made of a gradient of authority scores in a region "n" ranks before the i-th ranked answerer, or in a region about the i-th ranked answerer. In one example, if "n" is set to the value 5, then a gradient is derived from the authority scores of the 5 answerers before a current i-th answerer. In particular, the gradient is obtained from the answerer ranking list A. When the gradient exceeds the value delta, the answerers before the i-th answerer have low authority rankings, and indicate that answerers in that portion of set A may be considered to be poor answerers.

At block 408, the gradient is compared to a value "delta." The value delta may be selected and/or adjusted to control a number of poor answerers within a population of answerers. If the gradient is greater than delta, and the number of elements in the set of poor answerers "P" is less than 1% of the number of answerers in A, then the i-th answerer is inserted into the set of poor answerers at block 412. Alternatively, the set of poor answerers is considered complete, and is output at 410. Regarding the decision at block 408, if the gradient is less than or equal to delta, then it may be the case that the i-th answerer is too average to be considered a poor answerer. Similarly, if the set of poor answerers has grown to 1% of the number of answerers, then the i-th answerer may be too average to be considered a poor answerer. At block 414, the iteration counter "i" is decremented, and the loop 404-412 may be repeated.

Example Flow Diagrams for QA Thread and Forum Management

Figure 5:
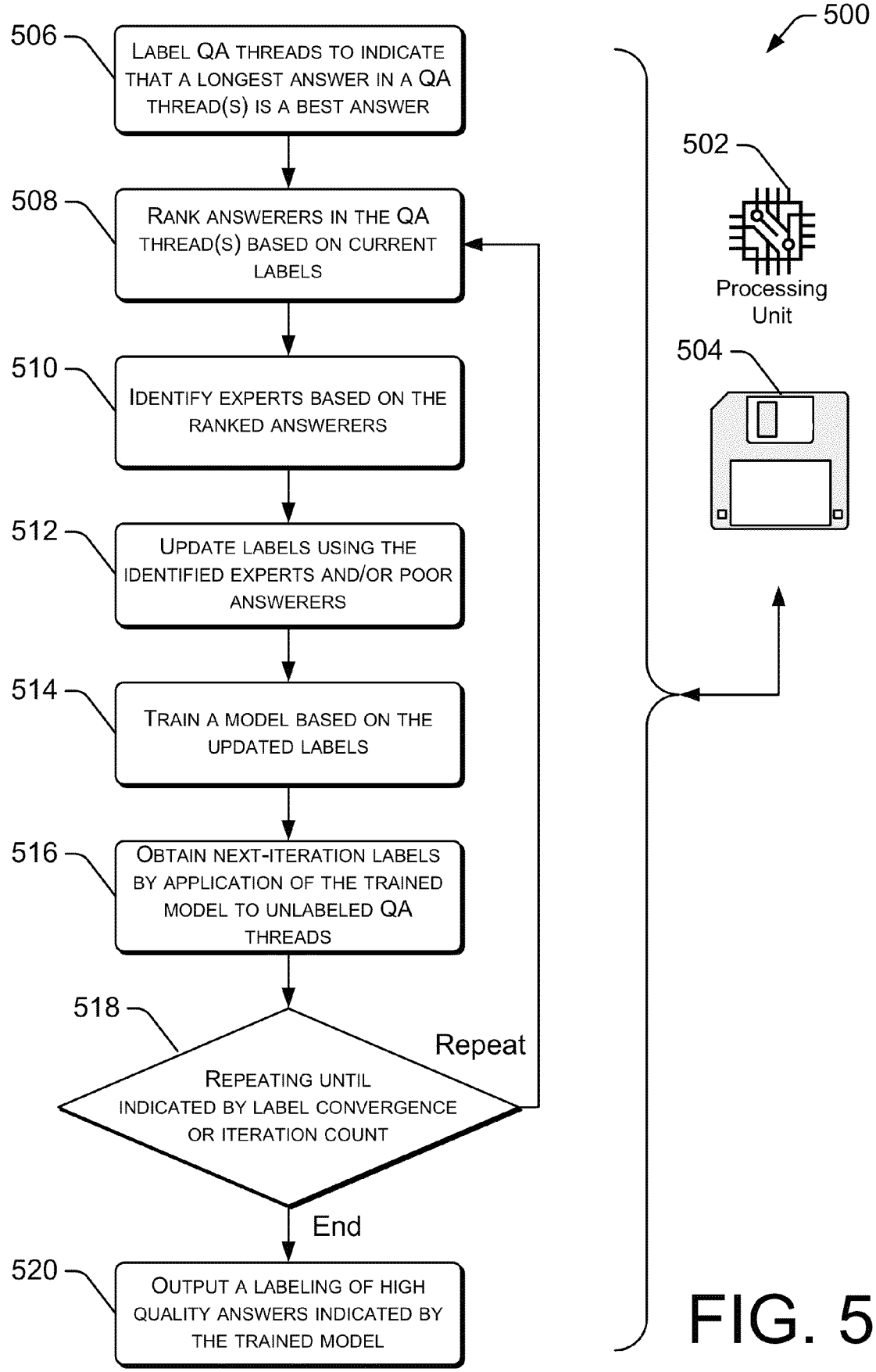
FIG. 5 is a flow diagram illustrating an example process configured to provide an initial labeling of answers in a QA forum based on answer length, to determine expert answerers, to train a model, and to refine a labeling of answers in an iterative manner to assist users in finding the best answer.

FIG. 5 is a flow diagram illustrating example processes 500 for content customization with security for client preference. The example processes 500 of FIG. 5 can be understood in part by reference to the configurations of FIGS. 1-4. However, FIG. 5 contains general applicability, and is not limited by the drawing figures and/or prior discussion.

Each process described herein is illustrated as a collection of blocks or operations in a logical flow graph, which represent a sequence of operations that can be implemented in hardware, software, or a combination thereof. In the context of software, the operations represent computer-executable instructions stored on one or more computer-readable storage media 504 that, when executed by one or more processors 502, perform the recited operations. Such storage media 504, processors 502 and computer-readable instructions can be located within a QA forum and/or answer labeling system (e.g., system 100 of FIG. 1 or system 200 of FIG. 2) according to a desired design or implementation. The storage media 504 seen in FIG. 5 is representative of storage media generally, both removable and non-removable, and of any technology. Thus, the recited operations represent actions, such as those described in FIGS. 3-5, and may be performed under control of one or more processors configured with executable instructions. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The computer- and/or processor-executable instructions may be stored in a memory communicatively coupled to a processor and executed on the processor to perform one or more methods described herein. The above discussion may apply to any system, flow and processes illustrated and/or described herein.

In contrast, communication media may embody computer-readable instructions, data structures, program modules, or other data in a modulated data signal, such as a carrier wave, or other transmission mechanism. As defined herein, computer storage media does not include communication media.

FIG. 5 is a flow diagram illustrating an example process 500 configured to provide an initial labeling of answers in a QA forum based on answer length, determine expert answerers, train a model, and provide a refined labeling of answers in a QA forum to assist users in finding the best answer. At operation 506, QA thread(s) are labeled to indicate that a longest answer in a QA thread is a best answer in the QA thread(s). In one example, the initial labeling is indicated by $L_0$ or other notation. The labeling may be performed by an initial labeling function, such as initial labeling function 202, seen in FIG. 2.

At operation 508, answerers are ranked in the QA thread(s) based on current labels associated with each answer in a QA thread(s). The ranked answerers listing may be indicated by notation such as $A_k$, which indicates a k-th iteration to the set of answerers A. Each iteration of the set of answerers A indicates a refinement of the set, which may rank answerers based on their authority scores as indicted by a prior labeling of answers in QA thread(s). Thus, the k-th iteration of the set of answerers, $A_k$, may be based on the labeling $L_{k-1}$. In a first iteration of the ranked answerer listing, $A_1$, the labels may be indicated by $L_0$. In one example, the ranking of answerers may be performed by an answerer ranking function, such as answerer ranking function 206 seen, in FIG. 2.

At operation 510, experts are identified. In one example, a k-th iteration of a set of experts $E_k$ may be selected or identified from the ranked set of answerers $A_k$. In one example, the experts may be identified by an answerer identification function, such as answerer identification function 208, seen in FIG. 2, which identifies answerers having particular characteristics. Such a function may determine experts in a manner consistent with, or suggested by, FIG. 3. Similarly, a k-th iteration of a set of poor answerers $P_k$ may be selected or identified from the ranked set of answerers $A_k$. This selection or determination may be made by answerer identification function 208 in a manner consistent with FIG. 4.

At operation 512, labels may be updated using the identified experts and/or poor answerers as input to a process. For example, updated labels L' may be set based on the labels $L_{k-1}$ and the set of experts $E_k$ and a set of poor answerers $P_k$. In one example, the updated labels may be obtained from a function, such as label update function 214 of FIG. 2.

At operation 514, a model is trained based on the updated labels. In one example, a k-th iteration of model $M_k$ is trained based on the updated labels L'. In one example, the model 216 of FIG. 2 is trained according to updated labels L' obtained from the label update function 214.

At operation 516, next-iteration labels are obtained by application of the trained model to unlabeled QA thread(s). That is, the trained model is applied to unlabeled QA threads, thereby labeling the threads. However, since this application of the model to the unlabeled QA threads is performed once per iteration, a copy of the unlabeled QA threads is maintained. The labels obtained in this manner may be considered a "next-iteration" of labels, in that they may be used in a next or subsequent iteration (unless the iterating is stopped at 518). In one example, the next-iteration labels $L_k$ are obtained based on application of the trained model $M_k$ to the unlabeled QA threads. The model $M_k$ represents a k-th iteration of the model M. In the example of FIG. 2, the updated labels $L_k$ are obtained from label generator 218 when applied to the unlabeled QA threads 102.

At operation 518, iteration of loop 508-516 continues until indicated by label convergence and/or iteration count. That is, the iteration continues until stopped by either convergence of sequential labeling or realization of iteration threshold. For example, iteration may be stopped when a difference between the labels $L_{k-1}$ and the labels $L_k$ is less than a threshold. This may be considered a comparison of the next-iteration labels with the prior labels. In a second example, iteration may be stopped after a maximum or threshold number of iterations. The iteration stop function 220 of FIG. 2 illustrates one example of a function suitable for execution of operation 518.

At operation 520, high quality answers are output. The high quality answers may be answers in the QA thread(s) indicated by the labels $L_k$ as being of higher quality. For example, the labels $L_k$ may be applied to unlabeled QA threads, thereby indicating high quality answers, which may be output. Additionally or alternatively, the ranked set of answerers $A_k$ may be output. And as a still further addition or alternative, the model $M_k$ may be output. In the example of FIG. 1, the answer quality evaluation model 106, the high quality answers in thread(s) 108 and the answerer ranking list (answerer authority score) 110 are output.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of managing a question and answer forum, comprising:
    under control of one or more processors configured with executable instructions:
        labeling question and answer (QA) threads to include labels indicating that a longest answer in a QA thread is a best answer in the QA thread;
        ranking answerers in the QA threads based on the labels;
        identifying experts based on the ranked answerers;
    updating the labels, wherein the updating is based in part on the identified experts and based in part on poor answerers;
    training a model based on the updated labels; and
    applying the trained model to unlabeled QA threads to obtain next-iteration labels.

2. A method as recited in claim 1, additionally comprising:
    repeating the ranking, identifying, updating, training and applying until:
        labels obtained by applying the trained model to unlabeled QA threads in sequential iterations produces less than a threshold amount of change; or
        a maximum allowed number of iterations is reached; and
    outputting a labeling of answers in the QA threads indicated by the next-iteration labels.

3. A method as recited in claim 1, additionally comprising:
    outputting the model, wherein the model has been trained sufficiently to result in less than the threshold amount of changes between sequential labelings of the QA threads; and
    outputting a ranking of answerers, including identification of both experts and poor answerers.

4. A method as recited in claim 1, wherein ranking answerers in the QA threads comprises:
    making an initial ranking of answerers based labeling indicating that the longest answer within the QA thread is the best answer in the QA thread; and
    making subsequent rankings of answerers based on labels obtained by operation of the model.

5. A method as recited in claim 1, wherein ranking answerers in the QA threads comprises:
    ranking an answerer as an expert if a gradient exceeds a threshold value, wherein the gradient is based on answerers ranked sequentially less proficient than the answerer.

6. A method as recited in claim 1, wherein ranking answerers in the QA threads comprises:
    ranking an answerer as an expert if the answerer is within a threshold value of a top-ranked answerer listed within the ranking of answerers.

7. One or more computer-readable storage media storing computer-executable instructions that, when executed, cause one or more processors to perform acts comprising:
    generating labels for answers in unlabeled question and answer (QA) threads, the labels based on answer length;
    ranking a set of answerers based on the labels;
    selecting a set of experts from the ranked set of answerers;
    selecting a set of poor answerers from the ranked set of answerers;
    setting update labels based on the labels and the set of experts and based on the set of poor answerers;
    training a model based on the update labels;
    obtaining next-iteration labels based on the trained model applied to the unlabeled QA threads;
    repeating the ranking, selecting, setting, training and obtaining until a difference between successive next-iteration labels is less than a threshold; and
    outputting answers as indicated by the next-iteration labels.

8. One or more computer-readable storage media as recited in claim 7, additionally comprising:
    outputting the ranked set of answerers; and
    outputting the model.

9. One or more computer-readable storage media as recited in claim 7, wherein generating labels for answers comprises setting a longest answer in a QA thread as a best answer.

10. One or more computer-readable storage media as recited in claim 7, additionally comprising:
    repeating the ranking, selecting, setting, training and obtaining only for a threshold number of iterations.

11. One or more computer-readable storage media as recited in claim 7, wherein selecting the set of experts from the ranked set of answerers comprises:
    estimating a gradient of authority scores about an answerer; and
    inserting the answerer into the set of experts if indicated by the gradient.

12. One or more computer-readable storage media as recited in claim 7, additionally comprising selecting a set of poor answerers from the ranked set of answerers according to acts comprising:
    estimating a gradient of authority scores about an answerer; and
    inserting the answerer into the set of poor answerers if indicated by the gradient.

13. One or more computer-readable storage media as recited in claim 7, wherein selecting the set of experts from the ranked set of answerers comprises:
    estimating a gradient of authority scores of the ranked set of answerers from n ranks after an answerer; and
    inserting the answerer into the set of experts if the estimated gradient exceeds a threshold and a size of the set of experts is less than 1% of a size of the set of answerers.

14. One or more computer-readable storage media as recited in claim 7, additionally comprising:
    estimating a gradient of authority scores in the ranked set of answerers from n ranks before an answerer; and
    inserting the answerer into the set of poor answerers if the estimated gradient exceeds a threshold and a size of the set of poor answerers is less than 1% of a size of the set of answerers.

15. A method for managing a question and answer forum, comprising:
    under control of one or more processors configured with executable instructions:
    labeling question and answer (QA) threads to indicate that a longest answer is a best answer in each QA thread;
    ranking a set of answerers based on labels of the labeled QA threads;
    selecting a set of experts from the ranked set of answerers;
    selecting a set of poor answerers from the ranked set of answerers;
    updating labels of the QA threads based on the labels of the QA threads and the set of experts and the set of poor answerers;
    training a model based on the updated labels;
    applying the model to the unlabeled QA threads to obtain a next-iteration of labels;
    repeating the ranking, selecting the set of experts, selecting the set of poor answerers, updating, training and applying while a difference between successive next-iteration labels is greater than a threshold; and
    outputting answers as indicated by the next-iteration labels.

16. A method as recited in claim 15, wherein selecting the set of experts comprises:
    selecting an answerer as an expert if a gradient exceeds a threshold value, wherein the gradient is based on answerers ranked sequentially less proficient than the answerer.

17. A method as recited in claim 15, wherein selecting the set of poor answerers comprises:
    selecting an answerer as a poor answerer if a gradient exceeds a threshold value, wherein the gradient is based on answerers ranked sequentially more proficient than the answerer.

18. A method as recited in claim 15, additionally comprising:
    outputting the ranked set of answerers; and
    outputting the trained model.

* * * * *